US012009120B2

(12) United States Patent
Stockwell et al.

(10) Patent No.: US 12,009,120 B2
(45) Date of Patent: Jun. 11, 2024

(54) CABLE CROSS-WEB

(71) Applicant: WEB INDUSTRIES, INC., Marlborough, MA (US)

(72) Inventors: Raymond Paul Stockwell, Jewett City, CT (US); James Andrew Evans, Griswold, CT (US)

(73) Assignee: WEB INDUSTRIES, INC., Marlborough, MA (US)

( * ) Notice: Subject to any disclaimer, the term of this patent is extended or adjusted under 35 U.S.C. 154(b) by 312 days.

(21) Appl. No.: 17/326,554

(22) Filed: May 21, 2021

(65) Prior Publication Data

US 2021/0375509 A1 Dec. 2, 2021

Related U.S. Application Data

(60) Provisional application No. 63/031,212, filed on May 28, 2020.

(51) Int. Cl.

| | |
|---|---|
| ***H01B 17/56*** | (2006.01) |
| ***H01B 3/30*** | (2006.01) |
| ***H01B 11/02*** | (2006.01) |
| ***H01B 19/00*** | (2006.01) |

(52) U.S. Cl.

CPC ............... *H01B 17/56* (2013.01); *H01B 3/30* (2013.01); *H01B 11/02* (2013.01); *H01B 19/00* (2013.01); *Y10T 29/532* (2015.01)

(58) Field of Classification Search

CPC ........ H01B 7/188; H01B 11/00; H01B 11/10; H01B 7/17; H01B 13/141; H01B 11/085; H01B 7/04; H01B 7/1815; H01B 17/56; H01R 13/6581; Y10T 29/532

USPC .................................. 29/745, 729, 755, 828

See application file for complete search history.

(56) References Cited

U.S. PATENT DOCUMENTS

| | | | |
|---|---|---|---|
| 3,911,200 A | 10/1975 | Simons et al. | |
| 5,969,295 A | 10/1999 | Boucino et al. | |
| 6,288,340 B1 | 9/2001 | Arnould | |
| 6,624,359 B2 | 9/2003 | Bahlmann et al. | |
| 6,639,152 B2 | 10/2003 | Glew et al. | |
| 6,812,408 B2 | 11/2004 | Clark et al. | |
| 6,974,913 B2 | 12/2005 | Bahlmann et al. | |
| 7,196,271 B2 | 3/2007 | Cornibert et al. | |
| 7,208,683 B2 | 4/2007 | Clark | |
| 7,637,776 B2 | 12/2009 | McNutt et al. | |
| 7,834,271 B2 | 11/2010 | Gromko et al. | |
| 8,313,346 B2 | 11/2012 | Sparrowhawk et al. | |
| 8,818,156 B2 * | 8/2014 | Nave .................. | G02B 6/4471 385/136 |
| 2004/0124000 A1 | 7/2004 | Stipes | |

(Continued)

FOREIGN PATENT DOCUMENTS

| | | |
|---|---|---|
| EP | 3462464 A1 | 4/2019 |
| JP | 2018-152282 A | 9/2018 |
| WO | 01/41158 A1 | 6/2001 |

OTHER PUBLICATIONS

International Search Report and Written Opinion for PCT/US2021/033552, International Patent Application corresponding to the instant pending application.

*Primary Examiner* — Thiem D Phan

(74) *Attorney, Agent, or Firm* — Hoffmann & Baron, LLP; Edward K Welch, II

(57) ABSTRACT

Cross-web for use in cable manufacture having a tape-like appearance in their relaxed state and their method of manufacture.

20 Claims, 8 Drawing Sheets

(56) References Cited

U.S. PATENT DOCUMENTS

| | | | |
|---|---|---|---|
| 2011/0243514 | A1 | 10/2011 | Nave |
| 2013/0248240 | A1 | 9/2013 | Glew et al. |

* cited by examiner

CABLE CROSS-WEB

The present application claims the benefit of U.S. Provisional Patent Application No. 63/031,212 filed May 28, 2020, entitled "Cable Cross-Web," the contents of which are hereby incorporated herein by reference in their entirety.

TECHNICAL FIELD

The present teaching is directed to cross-webs for use in the manufacture of transmission and/or conductive cables wherein the cross-webs are economically produced and allow for more economic cable production. Specifically, the present teaching is directed to cross-webs having an elongated "H" or a flattened "X" cross-section and their method of production. The present teaching is also directed to the method of transitioning the cross-webs for use in conductive cables as well as to conductive cables using the cross-webs.

BACKGROUND

Cross-webs are three dimensional, continuous polymeric or mostly polymeric cord-like structures used as spacers/separators in the manufacture of cables, particularly transmission and/or conductive cables. Most especially they comprise a polymeric preformed elongate structure extending from a proximal end to a distal end and having a longitudinally extending core and a plurality of longitudinally extending walls radiating from the core and ending at a peripheral edge, each pair of adjacent walls defining a longitudinally extending channel along the length of the cross-web. The channels serve as conduits for one or more conductors or conductive or transmissive wires or elements, most typically, a twisted pair of conductive wires.

Cross-webs are produced in a variety of different profiles, shapes, sizes, configurations, cross-sections, and constructions or elements. The simplest cross-webs are those of an extruded polymer, typically a dielectric polymer having a dielectric constant of from 1 to 9, whose cross-section is that of a "+" (FIG. 1). As shown, the cross-web 1 has a longitudinal core 3 defining the longitudinal axis of the cross-web with four walls 5 extending longitudinally along the core and radiating from the core and ending at a peripheral edge 7, each wall perpendicular to the adjacent wall. The height (H) of each wall is typically, and is preferably, the same; though the walls themselves may have different thicknesses (T). For example, Cornibert et. al. (U.S. Pat. No. 7,196,271 B2) teaches cross-webs having four walls, wherein each pair of walls on opposite sides of the core are of the same thickness, but are of a different thickness from the other pair. Similarly, the walls may have their own distinct cross-sectional profile. For example, Boucino et. al. (U.S. Pat. No. 5,969,295) teach walls wherein the thickness of the wall varies from the core to the peripheral edge. While the walls are generally planar, they may also be shaped whereby the cross-section provides a curved profile as with Clark (U.S. Pat. No. 7,208,683 B2). The resulting cross-webs may be used as is or subjected to further processing to apply continuous or discontinuous conductive layers or segments of a conductive material, processing aids, and the like.

Cross-webs are also produced through a multi-step lamination process whereby multi-layered films of a dielectric polymer, with or without a conductive layer or segments bonded thereto, and an adhesive or bonding layer are, themselves, laminated or bonded to one another and subsequently folded, are folded and then laminated to one another, or both, to form multilayered cross-webs of varying construction and cross-sectional shapes. Such cross-webs and their manufacture are taught in, for example, Bahlmann et. al. (U.S. Pat. No. 6,624,359 B2 and U.S. Pat. No. 6,974,913 B2), Gromko et. al. (U.S. Pat. No. 7,834,271 B2), and Simons et. al. (U.S. Pat. No. 3,911,200). Although each contributes in their own way to advancements in cable construction, such methods and cross-webs are expensive and time intensive.

A third type of cross-web is also an extrusion, but does not have "walls" in the true sense of the term. Rather, these extrusions have a more solid, pipe-like cross-section having open or closed, preferably open, channels along their longitudinal outer surfaces. Such cross-webs are taught in, for example, Glew et. al, (U.S. Pat. No. 6,639,152 B2).

While each of these technologies have their attributes and benefits, clearly some are more labor intensive and expensive than others. However, a negative aspect of all of these cross-webs, one which is not related to their performance as a cross-web, is the fact that all are three dimensional, occupying a space that is equivalent to or substantially equivalent to a cable whose diameter is the same as the length of a line drawn from the peripheral edge of one wall through the core and ending at the peripheral edge of the wall on the other side of the core. While a cross-web having a true "+" cross-section will allow for some compacting due to interleafing of the walls upon winding when wound or piled one atop the other, the degree of compaction is minimal.

Again, while not affecting performance of the cross-web, the spatial requirements of these cross-webs do affect storage, handling and shipping costs. The spatial requirements also affect the subsequent cable manufacturing costs and efficiencies since a given spool of the cross-web can only hold a set length of the cross-web. When that length of cross-web is depleted, the cable manufacturing line must be shut down to allow for the switching out of an empty spool for a new spool of the cross-web material. Hence, the spool size and length of the cross-web wound thereon affects the frequency at which such interruptions in cable manufacture occur.

Accordingly, there is still a need for low cost cross-webs, both from a manufacturing perspective and a post manufacturing perspective, the latter referring to costs associated with the storage, handling and transportation the cross-webs.

Additionally, there is still a need for cross-webs that allow for a less costly and more efficient cable manufacture, particularly one that enables a manufacturing process that incurs less frequent interruptions due to depleted feeds of the cross-web material.

SUMMARY

The present teaching provides for a cross-web having minimal spatial requirements which cross-web is formed of a pliable polymeric material, preferably a dielectric polymeric material, with or without additives dispersed therein, said cross-web further characterized, in its relaxed post-manufactured state, as having an elongated "H" or a flattened "X" cross-section and an elongated tape or tape-like appearance. Specifically, the cross-web according to the present reaching is a preformed elongate structure a) extending from a proximal end to a distal end, b) having a longitudinally extending core corresponding to the cross-bar of the "H" or the intersection of the flattened "X" and c) at least three, preferably at least four longitudinally extending walls each extending from the core and ending at a peripheral edge, wherein the aspect ratio of the cross-section of the cross-web in its relaxed state is at least 5:1, preferably at least 8:1, more preferably at least 10:1. Preferably, the cross-web has four walls, each wall having an opposing wall, i.e., one on the other side of the core, which is in a linear or near linear relationship with the other. Similarly, those walls adjacent to each other, i.e., on the same side of the core, will be parallel or generally parallel to one another. Although the most preferred embodiment will have four walls, there may be more, preferably no more than six.

The polymeric material used to form the cross-web may be a virgin polymer or a polymer having incorporated therein various ingredients conventional for use in cross-web manufacture, preferably the polymeric material is a dielectric polymeric material. Similarly, the cross-webs of the present teaching may be solely composed of the aforementioned polymeric material, or depending upon the use and performance needed therefrom, the cross-webs may also integrate and/or have applied to their surfaces films, foils, and/or coatings of other materials, consistent with cross-webs generally. For example, coloring agents may be incorporated into the polymer to enable color coding of the cross-web materials to distinguish between cross-webs formed by the same process for different applications, of different materials, etc. Similarly, one may incorporate conductive particles into the polymer to aid in EMI/FRI shielding or co-extrude a layer of such modified polymer with another polymer to form a multilayered cross-web. Alternatively, to aid in shielding properties, one may laminate or bond a continuous or discontinuous conductive foil or segments of a conductive foil to one or both surfaces of one or more walls. Similarly, it may be desirable to apply coating materials to the surface of the cross-web to aid in its processability in the manufacture of conductive cables. Depending upon the method by which the cross-webs of the present teaching are produced, such additional materials may be present at the time of production of the cross-web or, preferably, may be applied following the production of the cross-web. In the case where it is present at the time of production of the cross-web by fusion or bonding, these additional layers or materials are preferably present on the outward facing surface of the strips, not the surfaces to be fused or bonded.

The cross-webs of the present teaching may be made by extrusion or they may be made by polymer fusion or adhesive bonding of multiple, preferably two, strips of the polymeric material along their longitudinal axis at or near the centerline. Polymer fusion may be achieved by any of the known methods of polymer fusion including, ultrasonic welding, rotary hotplate welding, laser welding and/or use of a soldering iron. Adhesive bonding employs a curable adhesive or similar bonding agent, preferably an instant adhesive, e.g., a cyanoacrylate or methylidene malonate, or a curable adhesive, e.g., a (meth)acrylate adhesive. In each of the latter two processes, the width of the fuse or bond line is dependent upon the polymer materials themselves, the method by which the fuse or bond is achieved, the strength of the fuse or bond, particularly the cohesive and adhesive strength of the adhesive and the flexibility of the cured adhesive. Preferably, the cross-webs are made by extrusion or polymer fusion, wherein, in the case of polymer fusion, fusion is achieved by ultrasonic welding, rotary hotplate welding, or laser welding, most preferably extrusion.

DETAILED DESCRIPTION

As used herein and in the appended claims, the term "cross-section" means the cross-sectional view or image of the specified element taken perpendicular to the longitudinal axis of that element. Additionally, the term "pliable" when referring to the polymers, particularly the dielectric polymers, means that a) the walls of the cross-web may be bent or manipulated, with or without heating, along their longitudinal length at the core and/or across their height without fracturing even when the degree of the bend is up to 45° relative to the wall in its relaxed state and b) the cross-web itself may be bent perpendicular to its longitudinal axis over a radius of at least two inches, preferably, at least one inch, without fracture. The term "relaxed state" refers to the cross-web without or prior to the application of any external forces acting to separate or push together adjacent walls, preferably as produced and the term "open state" refers to the cross-web after the application of forces to bend or move adjacent walls away from each other. Finally, though the present teaching is disclosed and claimed in terms of cross-webs having an "H" or "X" cross-section in their relaxed state, it is to be appreciated and understood, that these terms are also intended to encompass those cross-webs having three walls, which would have more of a flattened "Y" shape cross-section, as well as those having more than four walls, though preferably no more than six, which would more of a double "H" or "X" cross-section in their relaxed state.

Figure 1A:
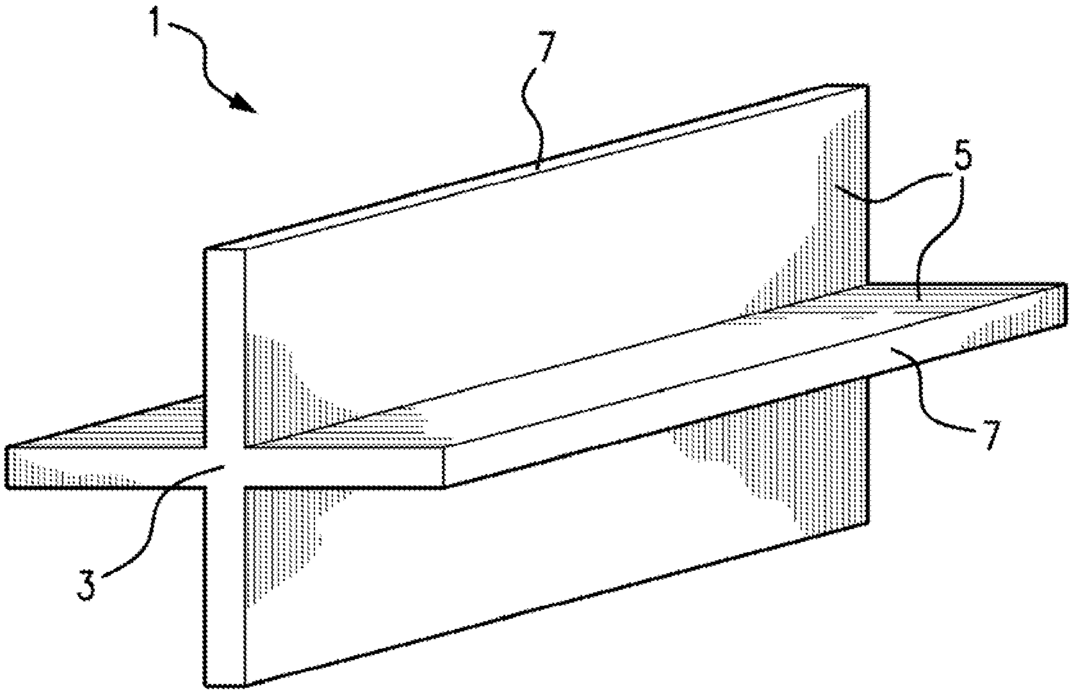
FIG. 1A is a perspective view of a segment of a typical "+" type cross-web.
Figure 1B:
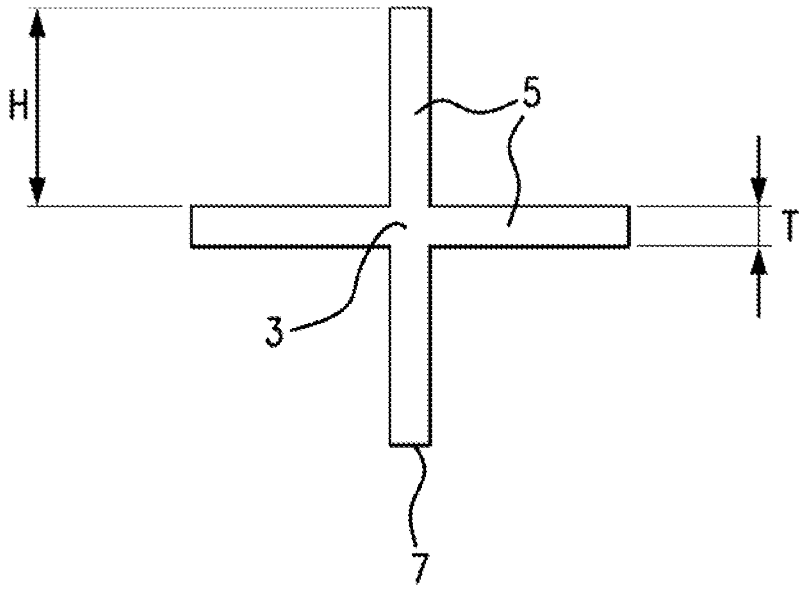
FIG. 1B is a cross-sectional view of the cross-web of FIG. 1A.
Figure 2A:
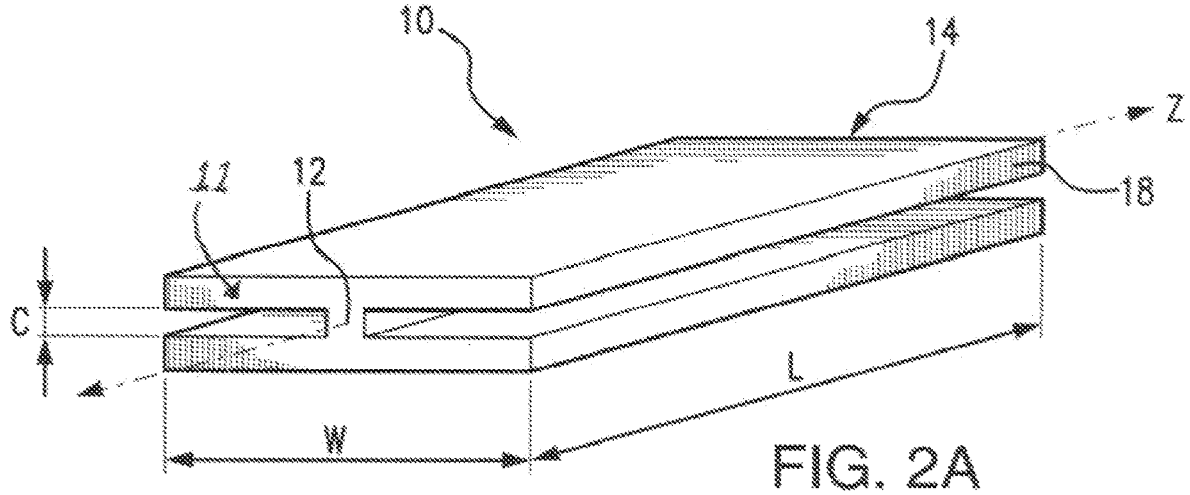
FIG. 2A is a perspective view of a segment of an elongated "H" type cross-web according to the present teaching in its relaxed state.
Figure 2B:
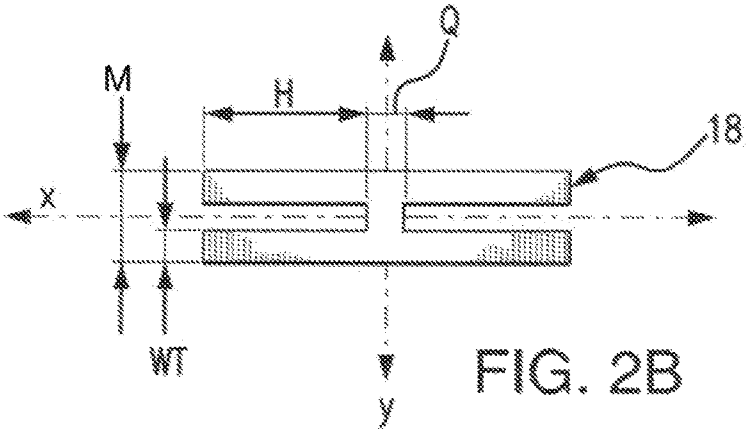
FIG. 2B is a cross-sectional view of the elongated "H" type cross-web of FIG. 2A in its relaxed state.
Figure 2C:
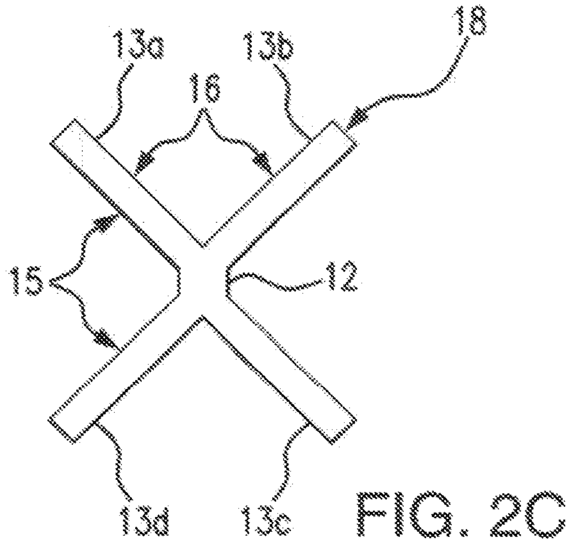
FIG. 2C is a cross-sectional view of the elongated "H" type cross-web of FIG. 2A in its opened state.

For ease of understanding and teaching, each of the cross-webs according to the present teaching have essentially the same features. For convenience, reference is made to FIGS. 2A, 2B and 20 for pointing out the common features and characteristics. FIG. 2A shows a perspective view of a segment of an elongated "H"-type cross-web 10 having a proximal end 11 and a distal end 14 wherein the length (L) refers to the longitudinal length of the cross-web along the longitudinal axis (z). FIGS. 2B and 2C show a cross-sectional view of the same cross-web having a major axis (x) and a minor axis (y), a central core 12 with four walls 13*a*, 13*b*, 13*c*, 13*d, a*) running longitudinally along the length of the core and b) extending away from the core and ending at a peripheral edge 18. Most preferably, the cross-web is such that each half of the cross-web is a mirror image or substantially a mirror image of the other half, whether sliced along the longitudinal axis along the minor axis or the major axis. Further, each of the outermost walls on the same side of the minor axis, the adjacent walls, have an inward facing surface 15 and an outward facing surface 16 and all walls have a height (H) and a wall thickness (WT). The width (W) of the cross-web refers to the distance from the peripheral edge of one wall to the peripheral edge of the opposing wall and the thickness (M) of the cross-web refers to the distance from the outward facing surfaces of the two most distant walls on the same side of the minor axis.

According to the present teaching there are provided cross-webs, particularly cross-webs for use in conductive or transmission cables, formed of a pliable polymeric material, preferably a dielectric polymeric material, which cross-webs are characterized as having a) an elongated "H" (FIG. 2B) or a flattened "X" (FIG. 4B) cross-section and b) an elongated tape or tape-like appearance, in their relaxed post-manufactured state. Specifically, the cross-web according to the present teaching is a preformed elongate structure a) extending from a proximal end to a distal end, b) having a longitudinally extending core corresponding to the cross-bar of the "H" or the intersection of the flattened "X" and c) at least four longitudinally running walls, each extending from the core and ending at a peripheral edge, wherein the aspect ratio of the cross-section of the cross-web, i.e., W:M, in its relaxed state is at least 5:1, preferably at least 8:1, more preferably at least 10:1. Preferably, the cross-web has four walls, one in each quadrant defined by the major and minor axes, with each of the walls on the same side of the minor axis being parallel to one another or at a slight to modest angle to one another. In the latter case, the angle may be up to 25°, preferably no more than 20°, more preferably no more than 10°, most preferably no more than 5%, with respect to the plane of the longitudinal axis and the major axis.

The dimensions and number of walls of the cross-web can be tailored to the particular needs of the end-use application and will, at least in part, be dependent upon the number and diameter of the wires or transmission elements to lie in the channels between adjacent walls of the cross-web. In following, the cross-webs may be manufactured or cut to specific lengths, but are preferably formed continuously and wound, preferably transverse wound, onto rolls of tens or hundreds of meters in length. The widths (W) of the cross-webs are generally from 0.05 to 2.0 inches, preferably from 0.08 to 1.7 inches, more preferably from 0.1 to 1.5 inches with a thickness (M) of from 0.004 to 0.2 inches, preferably from 0.008 to 0.15 inches, more preferably from 0.01 to 0.1 inches. The walls have height (H) of from 0.025 to 1 inch, preferably from 0.04 to 0.85 inches more preferably from 0.05 to 0.75 inches with a thickness (WT) of from 0.002 to 0.1 inches, preferably from 0.005 to 0.07 inches, more preferably from 0.01 to 0.05 inches. Of course, the walls may be of different thicknesses or they may all have the same thickness. Additionally, the walls may have a non-linear cross-sectional profile. For example, the walls may be thinner at their base and thicker at their peripheral edge or vice-versa. Similarly, they may have bulbous peripheral edges or extensions perpendicular to or angled with respect to the plane of the walls at or near their peripheral edge. In the case of walls having such extensions, the extensions are not considered in determining the thickness (M) of the cross-web or the thickness (WT) of the walls. Alternatively, or in addition thereto, the walls may have one or more, preferably a plurality of, parallel rib or rib-like structures running the length of the walls.

The cross-webs according to the present teaching are made of a pliable polymeric material, preferably a pliable, dielectric polymeric material, and are formed by extrusion or by fusing or bonding two strips of the polymeric material. Any suitable polymer can be used as the polymer base for forming the dielectric polymeric material from which the cross-webs are formed. Such polymers are well known and standard in the electrical cable industry and include, but are not limited to, the polyolefins, especially, polyethylene (PE), polypropylene (PP), ethylene propylene (EP), and polybutylene (PB); polyesters such as polyethylene terephthalate and polybutylene terephthalate; polyamides; polyethers, including polyetheretherketone (PEEK); polysulfones, including polysulfone (PSU), polyphenylene sulfone (PPSU), and polyethersulfond (PES); polyphenylenesulfide (PPS); halogenated polymers, including polyvinylchloride (PVC) and the fluorinated polymers, especially the perfluoropolymers and perfluoroalkoxy polymers (PFAs), such as fluorinated ethylene-propylene (FEP), polyvinyl fluoride (PVF), polyvinylidene fluoride (PVDF), polytetrafluoroethylene (PTFE), ethylene tetrafluoroethylene or poly(ethylene-co-tetrafluoroethylene (ETFE), ethylene chlorotrifluoroethylene (ECTFE), copolymers of tetrafluoroethylene (TFE) and perfluoropropylvinyl ether (PFPVE), polytetrafluoro-ethylene-perfluoromethylvinylether (MFA), and the like, and alloys/blends thereof. The preferred polymers generally have a dielectric constant of from 1 to 9, preferably from 1 to 6, most preferably, from 1 to 4.

The polymeric materials, especially the dielectric polymeric materials, may also have incorporated therein various conventional additives including fillers, conductive fillers (e.g. conductive powders, flakes, fibers and/or chopped fibers), flame retardants, anti-drip agents, smoke reducing agents, processing aids, nucleating agents, acid acceptors, blowing agents, and the like, consistent with cross-webs generally. For example, coloring agents may be incorporated into the polymer to enable color coding of the cross-web materials to distinguish between different cross-webs formed by the same process. Similarly, one may incorporate conductive particles into the polymer to aid in EMI/FRI shielding or co-extrude a layer of such modified polymer with another polymer to form a multilayered cross-web. Alternatively, to aid in shielding properties, one may laminate or bond a continuous or discontinuous conductive foil or segments of a conductive foil to one or both surfaces of one or more walls. Similarly, it may be desirable to apply coating materials to the surface of the cross-web to aid in its processability in the manufacture of conductive cables, Depending upon the method by which the cross-webs of the present teaching are produced, such additional materials may be present at the time of production of the cross-web or, preferably, may be applied following the production of the cross-web. In the case where it is present at the time of production of the cross-web by fusion or bonding, these additional layers or materials are preferably present on the outward facing surface of the strips, not the surfaces to be fused or bonded.

The cross-webs may be and are typically formed of the polymeric materials in their solid form; however, the cross-web materials may also be formed of a foamed or cellular polymer. In this instance a chemical or gaseous blowing or foaming agent is incorporated into the polymeric material before or concurrent with its extrusion so that a foamed or cellular material is formed, preferably with a smooth surface. Similarly, in the case where the cross-webs are formed by fusion or bonding, the strips of the polymer material to be fused or bonded may have a foamed or cellular interior. In the case of foamed or cellular cross-webs, the degree or extent of foaming may be up to 65 percent, typically from 25 to 65 percent, preferably from 35 to 55 percent. Foamed cross-webs are more easily formed by extrusion; however, the fusing or bonding of foamed tapes is also enabled.

As noted, the cross-webs of the present teaching may be made by extrusion or by the bonding or fusing of strips of the polymeric material. In the case of extrusion, the cross-web may be formed by the extrusion of a single polymeric material or the co-extrusion of two or more different polymeric materials, with or without the same polymer base, each having certain desired characteristics to be manifested in the final product. In the case of bonded or fused cross-webs, the strips of the polymeric material may be of a single polymer base or the strips may be a multilayered material; provided that, at least with respect to the fusion method, the surfaces to be fused or bonded are both polymer based, most especially the same polymer or polymers that may be compatibly fused to one another.

FIGS. 2A, 2B, and 2C depict an elongated "H"-type cross-web 10 formed by extrusion: FIGS. 2A and 2B showing the cross-web in its relaxed state and FIG. 2C showing the cross-web in its open state. The "H"-type cross-webs are characterized by two or more, preferably two or three, parallel or substantially parallel pair of opposing walls. The cross-web of FIG. 2A has two pair of opposing walls, 13*a* and 13*b* and 13*c* and 13*d*, each pair parallel to the other, and separated by the core 12. Of course, although the cross-web of FIG. 2A has adjacent walls that are parallel to one another, it is to be appreciated that the adjacent walls could be angled with respect to each other, again at an angle up to 25°, preferably no more than 20°, more preferably no more than 10°, most preferably no more than 5%, with respect to the plane of the longitudinal axis and the major axis. The height (C) and width (Q) of the core are defined by the extrusion die, but are generally, independently from 0.002 to 0.1 inches, preferably 0.01 to 0.05 inches, with an aspect ratio (C:Q) of about 2.5:1 to 1:2.5, preferably from about 1.7:1 to 1:1.7, more preferably about 1:1.

Figure 3A:
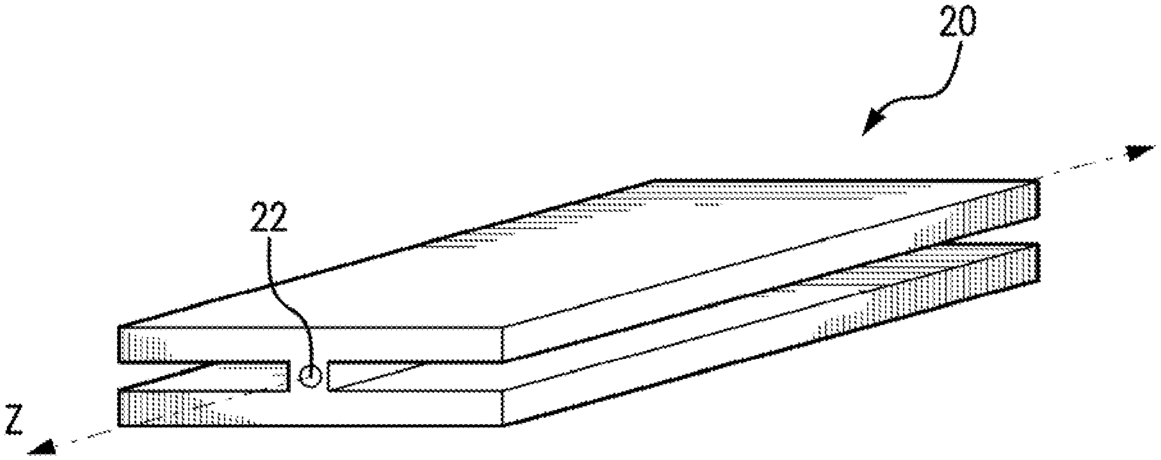
FIG. 3A is a perspective view of a segment of another elongated "H" type cross-web according to the present teaching having a hollow core in its relaxed state.
Figure 3B:
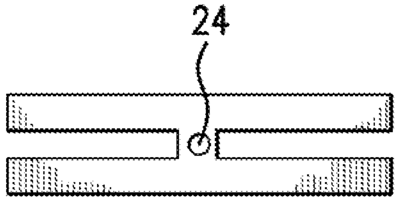
FIG. 3B is a cross-sectional view of the elongated "H" type cross-web of FIG. 3A in its relaxed state.
Figure 3C:
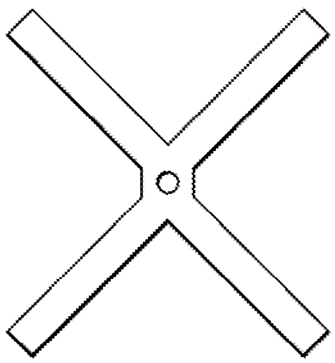
FIG. 3C is a cross-sectional view of the elongated "H" type cross-web of FIG. 3A in its opened state.

FIGS. 3A, 3B and 3C depict another extruded elongated "H"-type cross-web identical to that of FIGS. 2A, 2B and 2C, respectively, with the exception that this cross-web 20 has a hollow core 22. The hollow 24 extends along the longitudinal axis (z) of the cross-web.

Figure 4A:
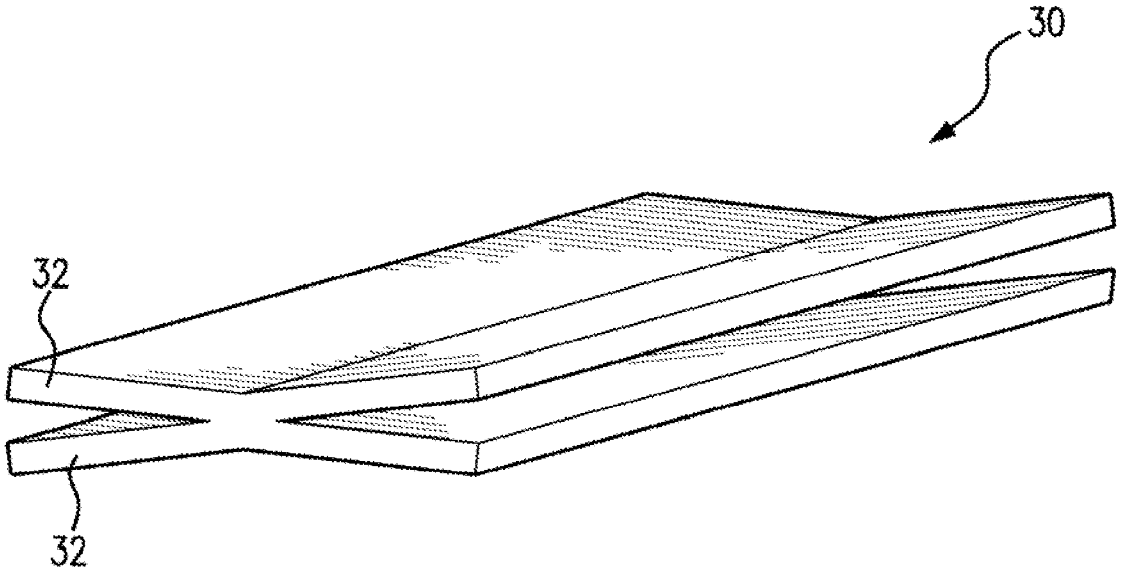
FIG. 4A is a perspective view of a segment of a flattened "X" type cross-web according to the present teaching in its relaxed state.
Figure 4B:
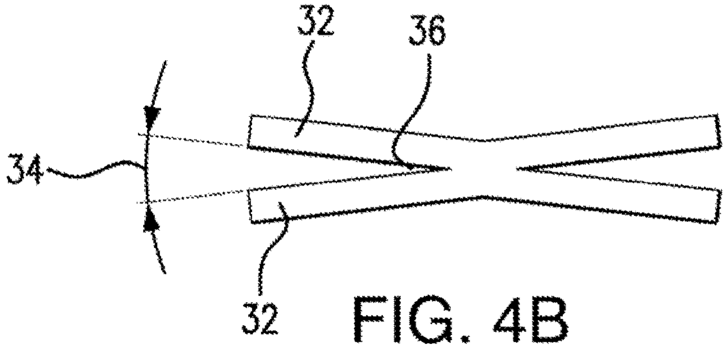
FIG. 4B is a cross-sectional view of the flattened "X" type cross-web of FIG. 4A in its relaxed state.
Figure 4C:
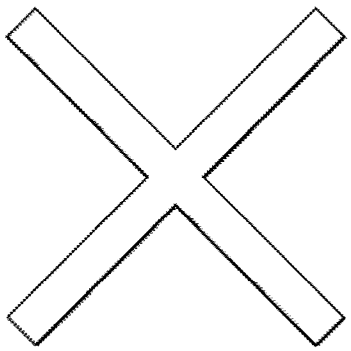
FIG. 4C is a cross-sectional view of the flattened "X" type cross-web of FIG. 4A in its opened state.

FIGS. 4A, 4B and 4C depict an extruded flattened "X"-type cross-web 30: FIGS. 4A and 4B showing the cross-web in its relaxed state and FIG. 4C showing the cross-web in its open state. The elements and characteristics of this cross-web 30 are the same as the cross-web of FIGS. 2A, 2B and 2C, respectively, except that the core has no or minimal height. Rather, the walls 32 directly intersect each other at the junction 36 at an angle 34, in the relaxed state as shown in FIG. 4B, of up to 25°, preferably no more than 20°, more preferably no more than 10°, most preferably no more than 5%, with respect to the plane of the longitudinal axis and the major axis.

Figure 5A:
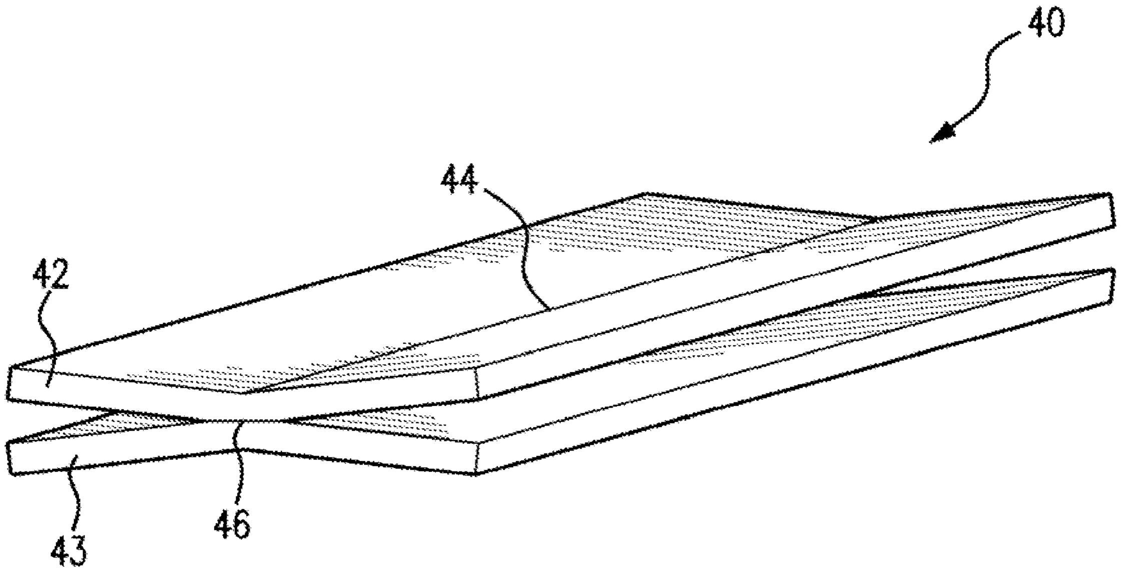
FIG. 5A is a perspective view of a segment of another flattened "X" type cross-web according to the present teaching in its relaxed state.
Figure 5B:
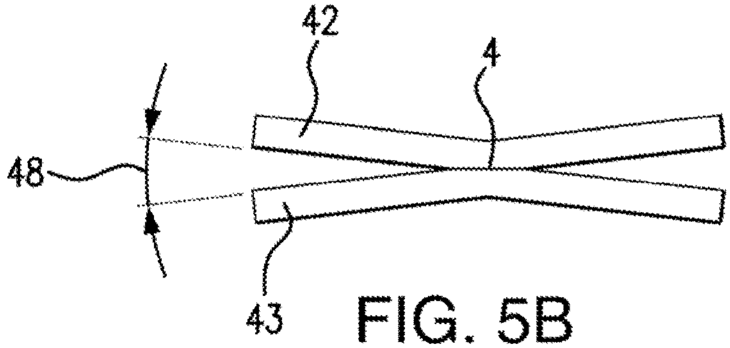
FIG. 5B is a cross-sectional view of the flattened "X" type cross-web of FIG. 5A in its relaxed state.
Figure 5C:
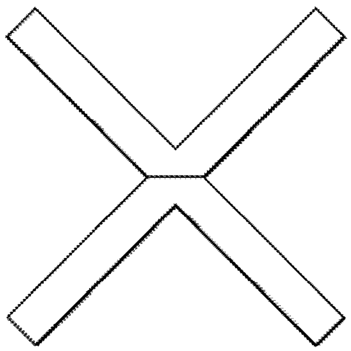
FIG. 5C is a cross-sectional view of the flattened "X" type cross-web of FIG. 5A in its opened state.

FIGS. 5A, 5B and 5C depict a flattened "X"-type cross-web 40 formed by the fusing of two strips 42,43 of the dielectric polymeric material, each strip having dimensions corresponding to the width (W) and the wall thickness (WT) of the desired cross-web, as noted above: FIGS. 5A and 5B showing the cross-web in its relaxed state and FIG. 5C showing the cross-web in its open state. In producing the fused cross-web, the two strips are fused along the longitudinal axis of the strips at or near the centerline 44. Fusing may be achieved by any known method including laser welding, ultrasonic welding, rotary hotplate welding or use of a soldering iron. The width of the fuse line 46 depends upon the fusing method and tooling employed as well as the strength of the fuse itself: certain polymers having a need for a wider fuse line than others. As is true for all "X"-type cross-webs, the angle 48 of the walls to the plane of the longitudinal axis and the major axis is up to 25°, preferably no more than 20°, more preferably no more than 10°, most preferably no more than 5%.

Figure 8:
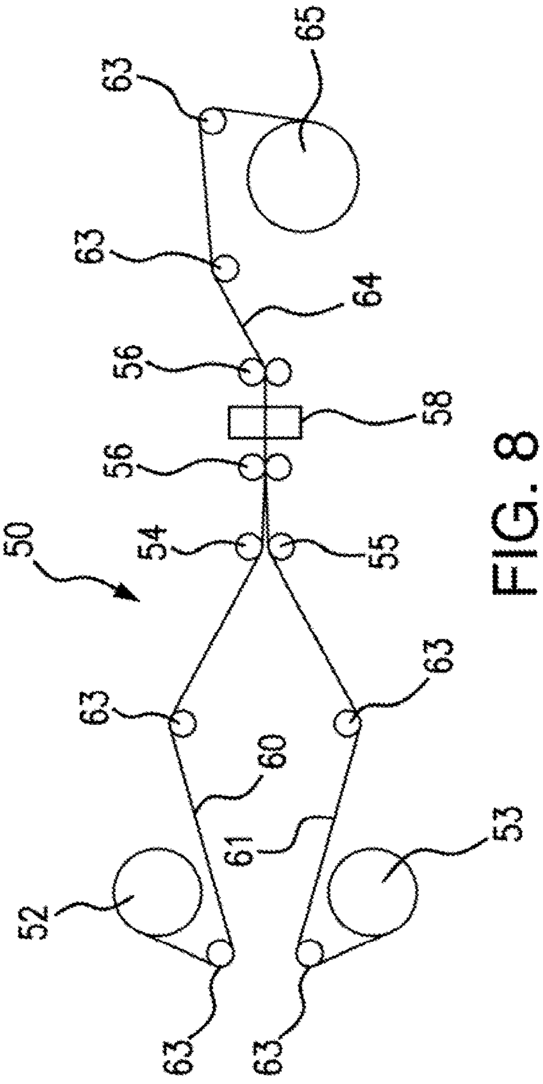
FIG. 8 is a simplified schematic drawing of a process for production of a cross-web using a fusion process.

FIG. 8 depicts a simplified schematic of a process of forming the cross-web by the fusion method. As shown, the fusion apparatus 50 comprises two supply rolls 52,53 of strips of the polymeric material 60,61. Each strip of the polymeric material is passed through a series of rollers 63 to a set of opposing rollers 54,55 which align the strips for mating along their longitudinal axes. The strips are then mated at pinch rollers 56 and guided to and through the fusion station 58, which may be a laser, a double laser, an ultrasonic horn, rotary hotplate, or the like. The fused cross-web 64 then exits the fusion station and passes through another set of pinch rollers 56 from which it passes through another series of rollers 63 before being wound on a take-up roll 65. Of course, a number of modifications may be made to this apparatus depending upon the final characteristics, properties and performance of the resulting cross-web as well as upon the operating efficiency of the process itself. For example, intermediate the rolls of the strip material and the alignment rollers, one may integrate a splicing station in each line where the strips may be spliced together to allow for a continuous process with but a brief interruption for the splicing of the new supply roll.

Figure 7A:
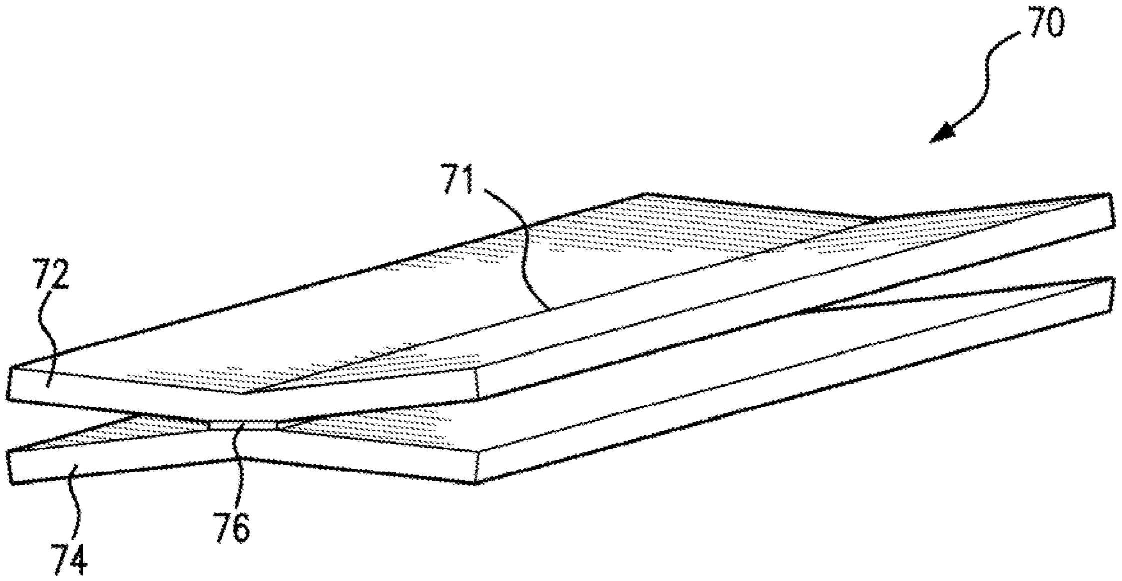
FIG. 7A is a perspective view of a segment of another flattened "X" type cross-web according to the present teaching in its relaxed state.
Figure 7B:
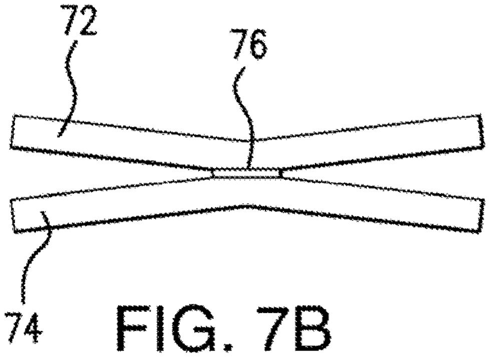
FIG. 7B is a cross-sectional view of the flattened "X" type cross-web of FIG. 7A in its relaxed state.
Figure 7C:
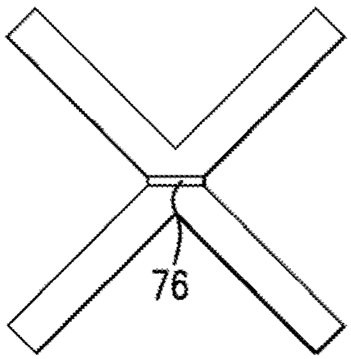
FIG. 7C is a cross-sectional view of the flattened "X" type cross-web of FIG. 7A in its opened state.

FIGS. 7A, 78 and 7C depict a flattened "X"-type cross-web 70 formed by the adhesive bonding of two strips 72,74 of the dielectric polymeric material: FIGS. 7A and 7B showing the cross-web in its relaxed state and FIG. 7C showing the cross-web in its open state. The elements and attributes of this cross-web are the same as that of the fused cross-web discussed above with the exception that the two strips of the dielectric polymeric material are bonded together along the longitudinal axis of the strips at or near the centerline 71 by an adhesive 76, preferably a curable/cured adhesive. The width of the bond line/cured adhesive is dependent, in part, upon the polymer base of the polymeric material, the cure characteristics and bond strength of the curable/cured adhesive, and the type of curable adhesive used. Suitable adhesives include the instant adhesives such as the cyanoacrylates, methylidene malonates, and the like; heat curable adhesives, photo curable adhesives (in the case of clear or radiation- or photo-transparent polymeric materials); anaerobically curable adhesives; and the like. Pressure sensitive adhesives may also be used, but are considered less preferred due to, oftentimes, a somewhat lesser bond strength as compared to the cured adhesives.

Figure 9:
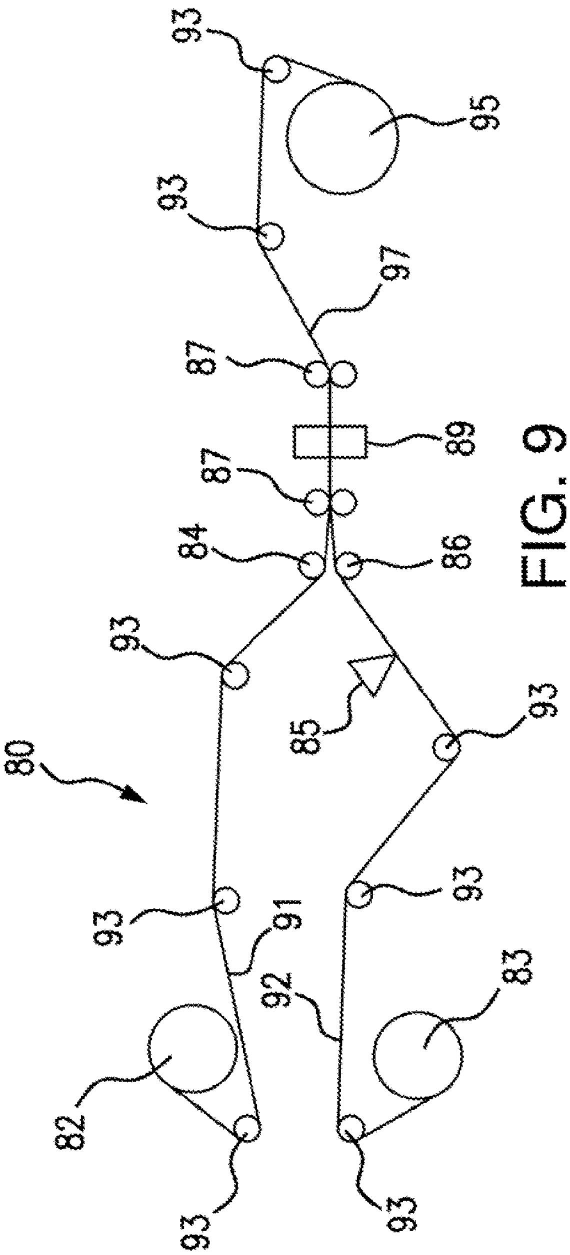
FIG. 9 is a simplified schematic drawing of a process for the product of a cross-web using the bonding process.

FIG. 9 depicts a simplified schematic of the process of forming the cross-web by the adhesive bonding method. As shown, the fusion apparatus 80 comprises two supply rolls 82,83 of strips of the polymeric material 91,92. Each strip of the polymeric material is passed through a series of rollers 93 to a set of opposing rollers 84,86 which align the strips for mating along their longitudinal axes. The strips are them mated at pinch rollers 87 and guided to and through an adhesive curing station 89, which may be a UV light source for photocurable adhesives, a heating chamber for heat curable adhesives, press rollers for pressure sensitive adhesives, etc. The bonded cross-web 97 then exits the curing station and passes through another set of pinch rollers 87 from which it passes through another series of rollers 93 before being wound on a take-up roll 95. Intermediate one of the supply rolls 83 of the strip material 92 and the alignment rollers 84,86 is an adhesive application station at which a continuous line or bead of the given adhesive material is applied to the polymer strip 92 at or near and along its centerline. The adhesive may be applied by a spray nozzle, a bead applicator, a transfer roller or the like. Depending upon the selection of the adhesive and the polymer base of the polymeric material it may be desirable to apply an adhesive primer to the polymer strip to which the adhesive is applied prior to application of the adhesive, to the centerline of the other polymer strip prior to the alignment rollers, or both. Similarly, it may be desirable to apply an activator to the corresponding centerline of the other polymer strip prior to the alignment rollers. Further, as with the prior embodiment, it may also be desirable to incorporate a splicing station into each of the pathways for the polymer strips, particularly before any station that may apply the adhesive, primer and/or activator to the polymer strips.

Figure 6:
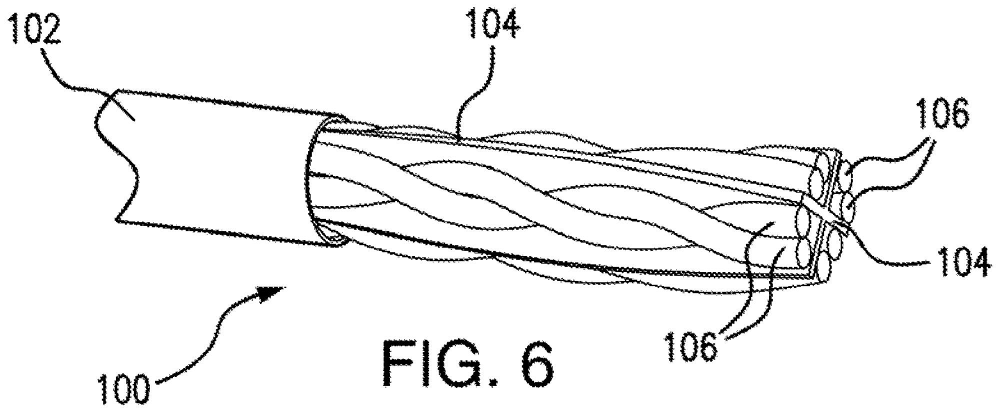
FIG. 6 is a cross-sectional view of a conductive cable incorporating the cross-web of FIG. A5.

The cross-webs produced in accordance with the present teaching are employed as spacers or separators in the production of transmission and conductive cables. In following, the present teaching is also directed to an improved process for the production of transmission and conductive cables wherein the improvement comprises the use of the cross-webs according to the present teaching and the method further comprises opening the cross-webs to accept the wires and cables themselves. FIG. 6 depicts a partial cut-away view of a cable end 100 of a cable incorporating the cross-web of the present teaching. The cable comprises an outer sheath 102 encasing a cross-web 104 and within each quadrant of the opened cross-web a twisted pair of conductive cables 106.

Figure 10:
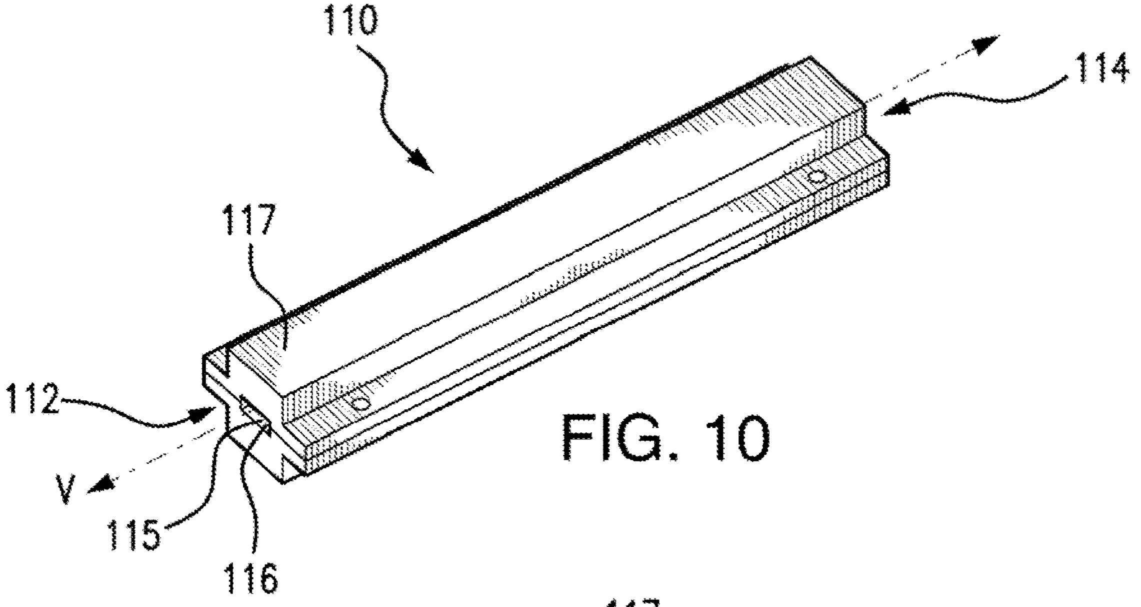
FIG. 10 is a perspective view of a tool for integration into a cable manufacturing process for opening the cross-web of the present invention.
Figures 11A, 11B, 11C:
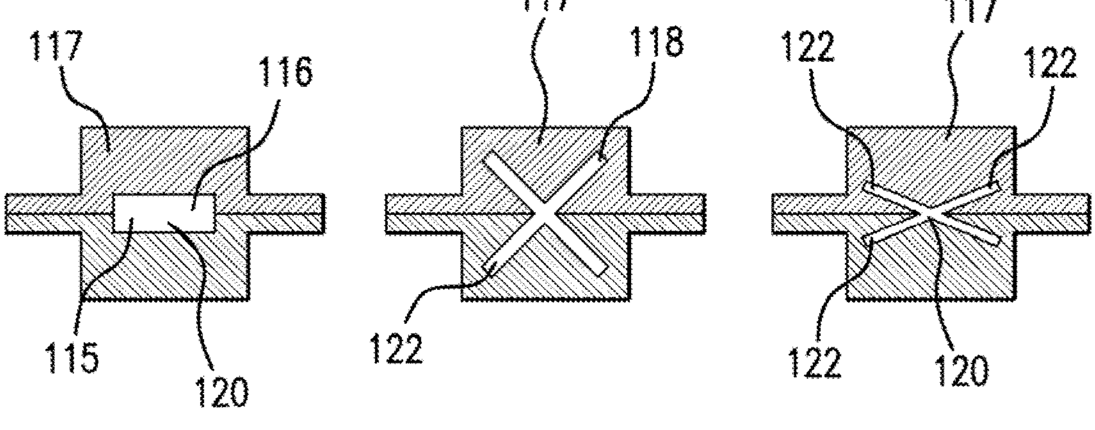
FIG. 11A is a proximal end-on view of the tool of FIG. 10.
FIG. 11B is a distal end-on view of the tool of FIG. 10.
FIG. 11C a cross-sectional view of the tool of FIG. 10 taken at the midpoint along its length.

In order to employ the cross-webs of the present teaching in the construction of a cable, it is necessary to transition the cross-web from its relaxed state to its open state prior to the integration of the conductive or transmissive wires or fibers. Though those skilled in the art having the benefit of this teaching may envision other means for accomplishing this, one method employs a tool element that accepts the cross-web in its relaxed state and gradually, along the length of the tool, opens the cross-web, forcing the adjacent walls apart. FIG. 10 depicts one such tool 110 having a proximal end 112 and a distal end 114. The tool has a passageway 115 through the body 117 of the tool along its central axis (v) which begins with a rectangular shape 116 at its proximal end (FIG. 11A) where the cross-web enters the tool and ends with an "X" shape 118 at its distal end (FIG. 11B) where the opened cross-web exits the tool. The region of the passageway along the central axis of the tool (shown at 120) remains constant and corresponds to the core of the cross-web. However, those portions of the passageway on opposite sides of the central region 120 bifurcate as one traverses the length of the tool forming two distinct channels 122 at the proximal end: the two channels corresponding to the walls of the cross-web. Gradually, the adjacent bifurcated channels diverge from one another, thereby separating the adjacent walls as the cross-web material advances from the proximal end to the distal end of the tool.

The dimensions of the passageway and channels are chosen to allow the cross-web to enter and pass through the tool with ease and preferably without resistance or friction. Although all of the figures of this specification show the tool with the final channels being at about a 90° angle to one another and the open cross-web as similarly having walls at approximately a 90° angle to one another, the angles may vary depending upon the needs and desires. Essentially, the extent to which the walls are separated is only that which is sufficient to allow the wires or conductors to nestle within the space between adjacent walls. Hence, it is contemplated that the angle between adjacent walls may be 45°, 60°, 75°, or whatever.

Similarly, the tool 110 and the depictions of the cross-webs in each of the figures shows a cross-web with four walls, it is to be appreciated that the tool can be conformed to accommodate the number of walls in the cross-web material. For example, a six walled cross-web may also be formed either by extrusion or by the fusion or bonding of three strips of polymeric material along their centerline. In this case, the tool would have six corresponding channels with the final angle of the adjacent walls being about 60° with respect to each other.

The tool may be formed of a plastic material, a composite material, a metal or the like. Preferably the tool is formed of metal. Additionally, to aid or facilitate the transitioning of the cross-web from the relaxed state to the open state, it may be desirable to integrate or associate a heating element or heating capability into the tool or to position a heating station or capability at or near the proximal end of the tool, either as part of the tool or as a separate element or feature. For example, a heating element may be incorporated into the tool body or a heating collar or like means may wrap around or encompass part or all of the tool body to transfer heat to the tool body. Alternatively, a separate heating station may be aligned immediately prior to the proximal end of the aforementioned tool. The extent of heating or warming need only be sufficient to soften or make more pliable the polymer of the cross-web. This will make the bending of the walls easier and reduce the strain in the polymer as it is manipulated or bent. The heating should not be such that it causes any tackiness to the polymer, particularly at its exposed surfaces, or adversely affects the fuse or adhesive bond, if present.

Additionally, depending upon the amount or level of heat applied, it may be desirable to integrate or have associated with the distal end of the tool a cooling element to cool down and, perhaps, 'freeze' the cross-web into its new, open configuration. Alternatively, one may employ a separate cooling station or means which engages the cross-web material as it exits the distal end of the tool. For example, although a cooling bath may be used, given the preferred in-line nature of cable manufacture and the desire to eliminate water from a cable manufacturing process, the preferred cooling element may be separate tool or a segment of the aforementioned tool aft of the distal end or at or near the distal end of the aforementioned tool, respectively. In these instances, the tool or segment may have one or more passageways though the tool body though which cool water flows, thereby cooling the tool and, in following, the cross-web passing through the tool or tool segment.

The tool and its associated elements, if any, are typically integrated into a cable forming apparatus to allow for seamless cable formation at or before the point in the process where the cables or wires are mated with the cross-web. Most preferably, it is integrated into the process at the point immediately before the introduction of the cables and wires.

The cross-webs of the present teaching perform comparably to the cross-web made by other methods. However, the process of making the cross-webs of the present teachings are simpler and do not require the extra apparatus, processing steps and processing time associated with many, if not most, conventional processes, particularly for multilayered cross-webs wherein multiple folds and adhesive layers and/or bonds must be employed. In this respect, the present cross-webs and their product realize savings and added simplicity with respect to adhesive bonding where just a thin bead or strip of the adhesive need be applied as opposed to the use of adhesive films or layers across the full width of the surfaces to be bonded and folded in conventional processes. Furthermore, the cross-webs of the present teaching can be made without adhesives altogether and without any folding.

More importantly, the present cross-webs benefit from marked savings and benefits associated with their unique, for cross-webs, shape in their relaxed state. Specifically, because of the tape-like shape of the cross-webs in their relaxed state, spools of the cross-web have at least 25%, preferably at least 35%, more preferably, at least 50% more cross-web than a similar spool of the same diameter having a traditional cross-web whose cross-sectional dimension is the same as that of the cross-web of the present teaching in its opened state. Consequently, there is significant savings on storage, transportation and handling costs for the cross-webs of the present teaching as compared to the same length of a cross-web material made by the conventional methods. Specifically, since a given length of cross-web according to the present teachings take up less space, more volume or length of cross-web is able to be stored in the same space occupied by a conventional spool of cross-web. In transportation and handling, more length can be transported and there are fewer rolls to be transported and handled for the same length of cross-web material. More importantly, at least from the cable manufacturer's perspective, besides taking up less storage space in their manufacturing facilities, the use of the spools of cross-web according to the present teaching allow for less frequent interruptions in the manufacturing process as fewer changeouts of the supply spool of the cross-web material are needed for a given length of cable to be produced.

Although the method and apparatus of the present specification have been described with respect to specific embodiments and figures, it should be appreciated that the present teachings are not limited thereto and other embodiments utilizing the concepts expressed herein are intended and contemplated without departing from the scope of the present teaching. Thus, true scope of the present teachings is defined by the claimed elements and any and all modifications, variations, or equivalents that fall within the spirit and scope of the underlying principles set forth herein.

We claim:

1. A cross-web for use in conductive or transmission cable said cross-web being formed of a pliable polymeric material and characterized as having a) an elongated "H" (FIG. 2B) or a flattened "X" (FIG. 4B) or "Y" cross-section, b) an elongated tape or tape-like appearance, c) an aspect ratio of its width to its thickness of at least 5:1, and d) a longitudinally extending core and three or more walls running longitudinally along the core, each wall extending from the core and ending at a peripheral edge, at least two of the walls extending in opposite directions from the core and at least two of the walls extending in the same direction from the core and being proximate or adjacent to one another and parallel to or at slight to modest angle relative to one another, the at least two walls proximate or adjacent to one another having an inner surface facing the at least one adjacent or proximate wall and an outward facing surface facing away from the adjacent or proximate wall, wherein the thickness of the cross-web is defined as the distance from the outer surface of one of the at least two adjacent or proximate walls to the outer surface of the other of the at least two adjacent or proximate walls and the width is defined as the distance from the peripheral edge of one wall to the peripheral edge of the wall extending in the opposite direction from the core; the pliability of the polymeric material being such that the proximate or adjacent walls are capable of being moved away from one another to allow the positioning within the space between the two of one or more wires or cable elements.

2. The cross-web of claim 1 wherein the aspect ratio is at least 8:1.

3. The cross-web of claim 1 wherein the aspect ratio is at least 10:1.

4. The cross-web of claim 1 wherein the cross-web has four to six walls.

5. The cross-web of claim 1 wherein the cross-web has four walls.

6. The cross-web of claim 1 wherein the polymeric material is a dielectric polymer material having a dielectric constant of dielectric constant of from 1 to 9.

7. The cross-web of claim 6 wherein the dielectric polymer has a dielectric constant of from 1 to 6.

8. The cross-web of claim 6 wherein the dielectric polymer has a dielectric constant of from 1 to 4.

9. The cross-web of claim 1 which is formed by extrusion.

10. The cross-web of claim 1 which is formed by fusing or bonding strips of the polymer material along their longitudinal axis, the fuse or bond line corresponding to the core.

11. The cross-web of claim 1 wherein the width of the cross-web is from 0.05 to 2 inches and the thickness of the cross-web is from 0.004 to 0.2 inches.

12. The cross-web of claim 1 wherein the width of the cross-web is from 0.08 to 1.7 inches and the thickness of the cross-web is from 0.008 to 0.15 inches.

13. The cross-web of claim 1 wherein the width of the cross-web is from 0.1 to 1.5 inches and the thickness of the cross-web is from 0.01 to 0.1 inches.

14. An improved process for manufacturing transmission and conductive cables comprising a cross-web and a plurality of wires and/or cable elements, wherein the improvement comprises the use of a cross-web formed of a pliable polymeric material and characterized as having a) an elongated "H" (FIG. 2B) or a flattened "X" (FIG. 4B) or "Y" cross-section, b) an elongated tape or tape-like appearance, c) an aspect ratio of its width to its thickness of at least 5:1, and d) a longitudinally extending core and three or more walls running longitudinally along the core, each wall extending from the core and ending at a peripheral edge, at least two of the walls extending in opposite directions from the core and at least two of the walls extending in the same direction from the core and being proximate or adjacent to one another and parallel to or at slight to modest angle relative to one another, the at least two walls proximate or adjacent to one another having an inner surface facing the at least one adjacent or proximate wall and an outward facing surface facing away from the adjacent or proximate wall, wherein the thickness of the cross-web is defined as the distance from the outer surface of one of the at least two adjacent or proximate walls to the outer surface of the other of the at least two adjacent or proximate walls and the width is defined as the distance from the peripheral edge of one wall to the peripheral edge of the wall extending in the opposite direction from the core; the pliability of the polymeric material being such that the proximate or adjacent walls are capable of being moved away from one another to allow the positioning within the space between the two one or more wires or cable elements, the method further comprising the step of moving the proximate or adjacent walls away from one another to allow the positioning within the space between the two one or more wires or cable elements.

15. The improved process of claim 14 wherein the aspect ratio of the cross-web is at least 8:1.

16. The Improved process of claim 14 wherein the aspect ratio of the cross-web is at least 10:1.

17. The improved process of claim 14 wherein the cross-web has four to six walls.

18. The improved process of claim 14 wherein the cross-web has four walls.

19. The improved process of claim 14 wherein the polymeric material is a dielectric polymer material.

20. The improved process of claim 19 wherein the dielectric polymer material dielectric has a dielectric constant of from 1 to 9.

* * * * *